(12) United States Patent
Thomsen et al.

(10) Patent No.: US 10,372,688 B2
(45) Date of Patent: Aug. 6, 2019

(54) MOVING DATA WITHIN A DISTRIBUTED DATA STORAGE SYSTEM USING VIRTUAL FILE LINKS

(75) Inventors: Dirk Thomsen, Heidelberg (DE); Ivan Schreter, Malsch (DE)

(73) Assignee: SAP SE, Walldorf (DE)

(*) Notice: Subject to any disclaimer, the term of this patent is extended or adjusted under 35 U.S.C. 154(b) by 594 days.

(21) Appl. No.: 13/290,835

(22) Filed: Nov. 7, 2011

(65) Prior Publication Data

US 2013/0117221 A1    May 9, 2013

(51) Int. Cl.
    *G06F 7/00*      (2006.01)
    *G06F 16/188*      (2019.01)
    *G06F 9/455*      (2018.01)

(52) U.S. Cl.
    CPC .. *G06F 16/188* (2019.01); *G06F 2009/45583* (2013.01)

(58) Field of Classification Search
    CPC ............................................. G06F 2009/45583
    USPC ........... 707/999.101, 999.102, 705, 675, 638
    See application file for complete search history.

(56) References Cited

U.S. PATENT DOCUMENTS

| | | | | |
|---|---|---|---|---|
| 5,452,447 | A * | 9/1995 | Nelson | G06F 12/08 |
| 6,938,039 | B1 * | 8/2005 | Bober | G06F 16/119 |
| | | | | 707/704 |
| 7,337,163 | B1 * | 2/2008 | Srinivasan | G06F 16/2453 |
| 7,725,498 | B2 * | 5/2010 | Barsness | G06F 16/221 |
| | | | | 707/803 |
| 7,873,629 | B1 * | 1/2011 | Morris | G06F 16/2453 |
| | | | | 707/715 |
| 8,244,735 | B2 * | 8/2012 | He | G06F 16/2237 |
| | | | | 707/745 |
| 8,335,783 | B2 * | 12/2012 | Milby | G06F 16/24542 |
| | | | | 707/718 |
| 2005/0240615 | A1 * | 10/2005 | Barsness | G06F 16/221 |
| 2007/0143564 | A1 * | 6/2007 | Uppala | G06F 16/27 |
| | | | | 711/173 |
| 2008/0244028 | A1 * | 10/2008 | Le | G06F 3/0607 |
| | | | | 709/208 |
| 2008/0256138 | A1 * | 10/2008 | Sim-Tang | G06F 11/1435 |
| 2010/0106934 | A1 | 4/2010 | Calder et al. | |
| 2010/0180092 | A1 * | 7/2010 | Rajaa et al. | 711/162 |
| 2010/0235335 | A1 | 9/2010 | Heman et al. | |
| 2011/0072059 | A1 * | 3/2011 | Guarraci | 707/823 |
| 2011/0137934 | A1 * | 6/2011 | Pizzorni | G06F 8/60 |
| | | | | 707/769 |
| 2011/0219020 | A1 * | 9/2011 | Oks | G06F 17/30 |
| | | | | 707/769 |
| 2012/0011176 | A1 * | 1/2012 | Aizman | G06F 16/183 |
| | | | | 707/822 |

(Continued)

*Primary Examiner* — Eliyah S. Harper
(74) *Attorney, Agent, or Firm* — Mintz Levin Cohn Ferris Glovsky and Popeo, P.C.

(57) ABSTRACT

A record within a destination virtual file is generated on a destination node of a distributed data storage system. The record comprises a link directed to a source virtual file stored on a source node. The source virtual file is mapped to a chain of linked pages stored in a page buffer of the distributed data storage system. A request is later received at the destination node to access data defined by the destination virtual file. Data is provided, in response to the request, from the source virtual file stored on the source node using the link. Related apparatus, systems, techniques and articles are also described.

22 Claims, 4 Drawing Sheets

(56) References Cited

U.S. PATENT DOCUMENTS

2012/0303581 A1* 11/2012 Calder .................... G06F 16/27
  707/626
2013/0054532 A1* 2/2013 Schreter .............. G06F 16/2358
  707/644

* cited by examiner

MOVING DATA WITHIN A DISTRIBUTED DATA STORAGE SYSTEM USING VIRTUAL FILE LINKS

TECHNICAL FIELD

The subject matter described herein relates to techniques for enabling access to and moving data within a distributed data storage system using virtual file links.

BACKGROUND

In a distributed data storage system, data containers must be moved sometimes from one node to another node to achieve load balancing. With some conventional database systems, this requires not only moving the data contained by such data containers but also one or more logs tracking changes to such data container. These operations can be processor intensive and can also consume additional storage.

SUMMARY

In one aspect, a record within a destination virtual file is generated on a destination node of a distributed data storage system. The record comprises a link directed to a source virtual file stored on a source node. The source virtual file is mapped to a chain of linked pages stored in a page buffer of the distributed data storage system. A request is later received at the destination node to access data defined by the destination virtual file. Data is provided, in response to the request, from the source virtual file stored on the source node using the link.

Data generated at the destination node subsequent to the generation of the record can be appended to the record. This appended data can form a delta log at the destination node. The destination virtual file and the delta log can be overwritten during a columnar table merge operation with a new version of the destination virtual file comprising data from the source virtual file and the delta log. The link in the record can be overwritten during the columnar table merge operation. The new version of the destination virtual file can be persisted to secondary data storage. The new version of the destination virtual file can be persisted after a savepoint on the destination node. The source virtual file can be dropped after the new version of the destination virtual file is persisted to the secondary data storage. The source virtual file can cease log operations relative to the source virtual file and dropping the source virtual file can include deleting the source virtual file.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current techniques allow for the movement of data among nodes within a distributed data storage system (i.e., a database system comprising a plurality of nodes, etc.) with little performance impact. Using links to virtual files as described herein obviates the need, during recovery from a log backup, for moving a virtual file from one node to the other which in turn requires writing a redo log on a destination node for all moved data or explicit expensive synchronization of recovery on several nodes. Stated differently, the use of a link to a virtual file requires a single operation (reading the linked virtual file) as opposed to physically moving data which requires at least three operations (writing data from the virtual file to the destination node, writing a log from the virtual file to the destination node, and reading data written to the destination node).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
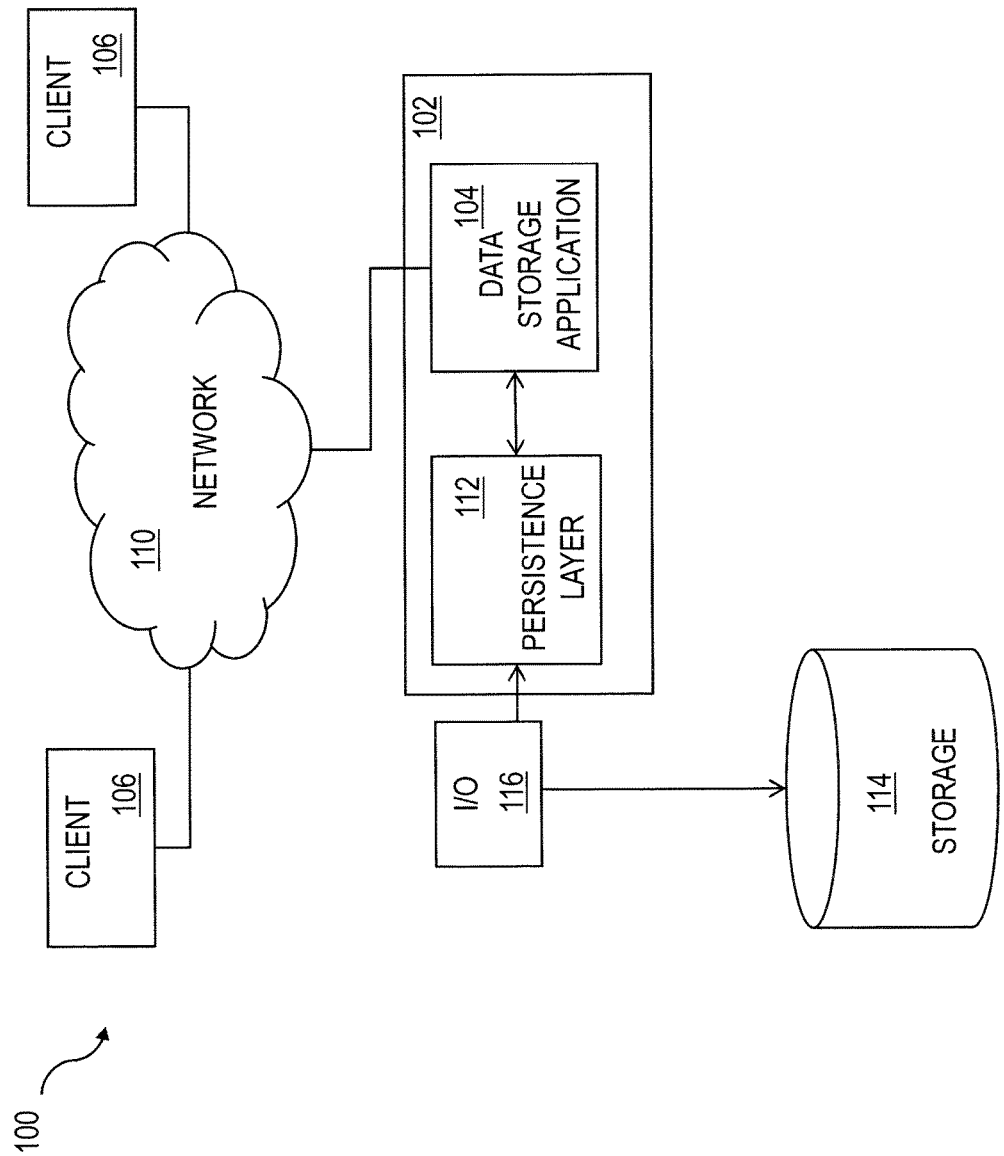
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
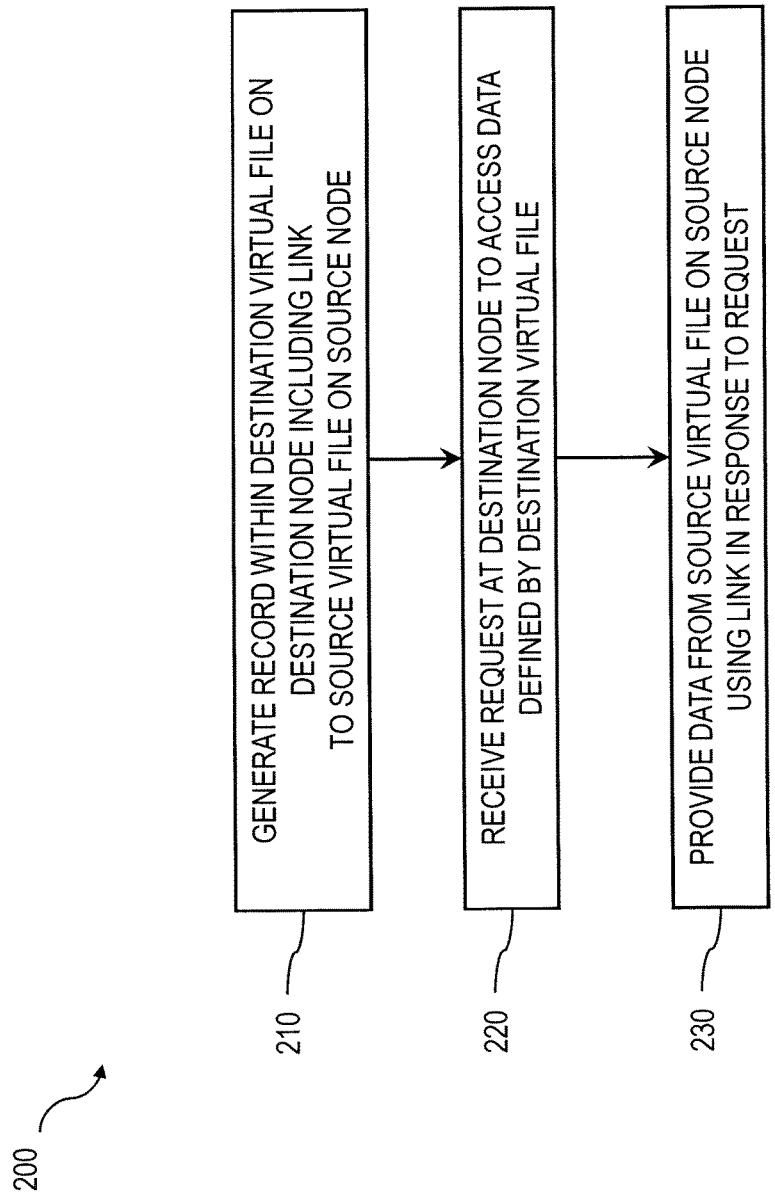
FIG. 2 is a process flow diagram illustrating moving data within a distributed data storage system using virtual file links.

FIG. 2 is a process flow diagram 200 in which, at 210, a record is generated on a destination node of a distributed data storage system. The record forms part of a destination virtual file and includes a link directed to a source virtual file stored on a source node. The source virtual file can be mapped to a chain of linked pages stored in a page buffer of the distributed data storage system. Subsequently, at 220, a request is received at the destination node to access data defined by the destination virtual file. In response to the request, at 230, data is provided from the source virtual file stored on the source node using the link.

Figure 3:
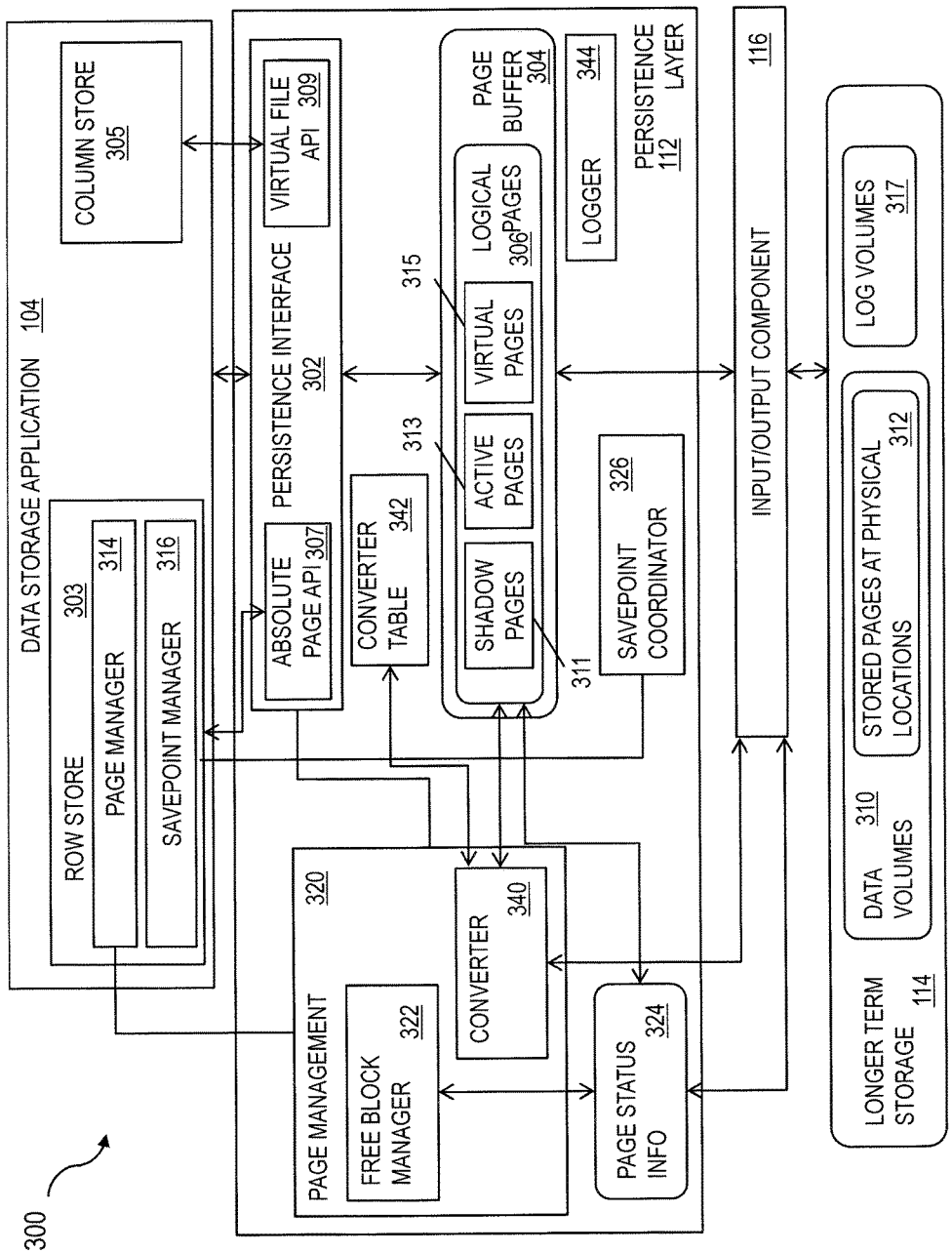
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages 311, active pages 313, data pages of virtual files 315 and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include a row store 303 and a column store 305. The row store 303 can comprise or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash. The row store 303 can access the persistence interface 302 via an absolute page API 307. The column store 305 which can store columns in contiguous memory can access the persistence interface 302 via a virtual file API 309.

In some implementations of a data storage application 104, the page management module of the persistence layer 112 can implement shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes 317 while normal data is written to data volumes 310. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 305 can persist its tables to virtual files provided by the persistence layer 112 via the virtual file API 307. Internally the persistence layer 112 can map a virtual file to a chain of linked pages 315 stored in the page buffer 304. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

As stated above, virtual files can be used to store main and delta parts of columnar tables. These files can be read on the first access of the corresponding table into memory. With some implementations, while read accesses happen only on the in-memory representation of data, updates, appends, overwrites and truncates can also be written to the virtual file on disk. After moving of a virtual file from a source node to a destination node, the virtual file can be read into memory on first access on the destination node. To support recovery from log backup, moving a virtual file from one node to the other (if the techniques described below are not incorporated) can either require writing a redo log on the destination node for all moved data or explicit expensive synchronization of recovery on several nodes, which is in both cases too big performance penalty.

The content of a main storage can only change when a delta merge operation is performed. Therefore the main virtual files can only be written when a merge is done. Note that this does not mean that main data is written to disk during a merge operation: when the column store 305 writes to a virtual file, the data can be written into the page buffer 304 of the persistence layer 112. It is the responsibility of the persistence layer 112 to determine when the data in the virtual file is actually flushed to disk (e.g., during page replacement or at latest when the next savepoint is written, etc.).

A delta merge operation is unique to the column store 305 and is not synchronized with the savepoints of the persistence layer 112. Delta merge is primarily an optimization of in-memory structures performed on the granularity of a single table. The savepoint, on the other hand, works on the whole database and its purpose is to persist changes to disk.

All changes executed on column store 305 data go into delta storages in the data volumes 310. The delta storages can exist only in memory as opposed to be written to disk. However, the column store 305 can, via the logger 344, write a persisted delta log that contains logical redo log entries for all operations executed on the delta storages. Logical log, in this context, means that the operation and its parameters are logged but no physical images are stored. When a delta merge operation is executed, the changes in the delta storage can be merged into the main storage and the delta log virtual file can be truncated.

Despite of the name "delta log", the delta log virtual files are not really logs from the persistence layer 112 point of view. For the persistence layer 112 they are just data. The actual redo log and undo entries can be written a log volume 317 in the persistence layer 112. The virtual files used for delta logs can be configured as logged. Whenever column store 305 writes to the delta log virtual file, the persistence layer interface 302 invokes the logger 344 and an undo manager to write redo log entries and undo information. This ensures that the delta log virtual files can be restored after a restart—just like any other data. After the delta log virtual files are restored they are ready to be processed by column store 305 to rebuild the in-memory delta storages from the logical delta log entries.

During a delta merge operation the main files for the affected table(s) can be rewritten and the delta log file can be truncated. For all these operations no log is written by the persistence layer 112. This is possible, because all operations executed on the tables were already logged when the delta files were written as part of the original change operation. The merge operation does not change, create or delete any information in the database. It is just a reorganization of the way existing information is stored. To prevent that logs are written for a merge operation, the virtual main files are configured as not logged and a special not logged operation is used for delta log truncation.

During restart, the persistence layer 112 can restore the main virtual files from the last savepoint. The delta log virtual files can be restored from the last savepoint and from the redo log. When the persistence layer 112 has finished its part, the main storage of the columns can be loaded from the virtual files into column-store memory. This involves memory copy operations between data cache in the page buffer 304 of the persistence layer 112 and the contiguous memory areas in column store 305. The column store 305 can then execute the logical redo entries from delta log virtual files and rebuild the in-memory delta storages.

As mentioned above, there is metadata that allows to define for each columnar table whether it is to be loaded during system startup. If a table is configured for loading on demand, the restore sequence for that table is executed on first access.

Figure 4:
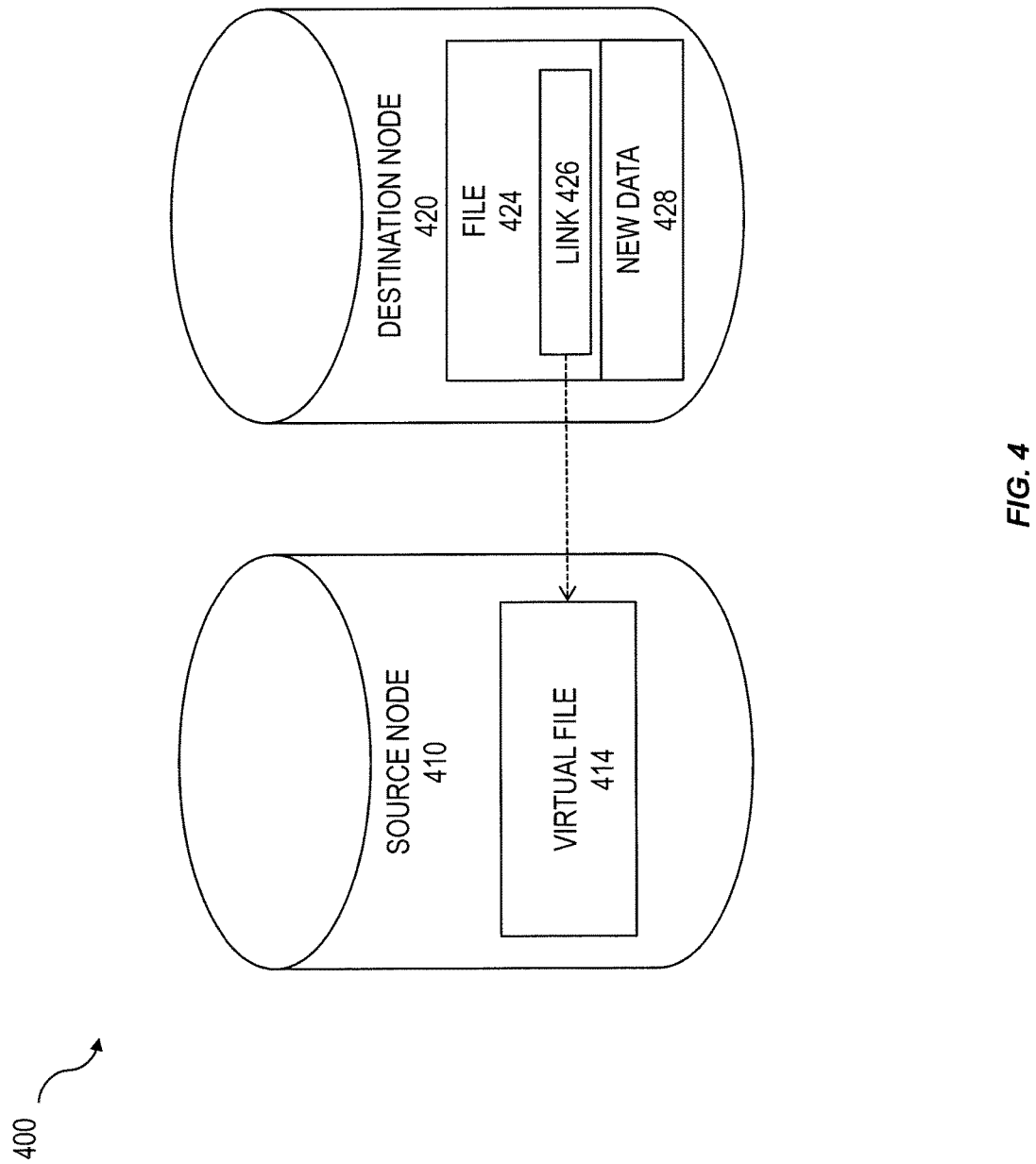
FIG. 4 is a diagram illustrating movement of data from a source node to a destination node within a distributed data storage system.

With reference to the diagram 400 of FIG. 4, a virtual file 414 on a source node 410 within a distributed data storage system can be "moved" by creating a new file 424 (e.g., an empty object, etc.) on a destination node 420 containing a special record 426 with a link to the original virtual file 414 on the source node 410. This operation can be logged by the logger 344. The original virtual file 414 can be kept unchanged on the source node. When the virtual file is read on the destination node, the link 426 is encountered which, in turn, results in the data from the original virtual file 410 being accessed on the source node 420. New data 428 can be appended after the link record 426 on the destination node 420, thus always all data of the file can be read. As used in this context, nodes can refer to servers having their own persistency.

When performing columnar table merge operation, virtual files containing compressed data of a corresponding table can be overwritten completely with the new version and the virtual file for deltas will be truncated. These operations can automatically overwrite the link 426 to the source node 410.

During a link cleanup operation after commit, the original files can be scheduled for removal. After a savepoint on the destination node 420 has persisted the new versions of the files to secondary storage, old files on the source node 410 can be dropped (non-logged). At this time, files can be completely moved to the destination node 420, without unnecessary performance penalty by logging whole contents on the destination node 420.

During recovery from log, link record 426 can be recovered as well as all new data 428 appended to the file. The old virtual file 414 on the source node 410 can be kept because dropping of the virtual file 414 on the source node 410 need not be logged. If the virtual file 414 is deleted during recovery, the deletion can schedule dropping the original file 414 on the source node 410 after recovery ends. Otherwise, there would be a file 424 with the link 426 to old data on the source node 420 (or even a chain of links, if the virtual file 414 has been moved several times).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer readable storage medium storing instructions that, when executed by at least one programmable processor, cause the at least one programmable processor to perform operations comprising:
   generating, on a destination node of a distributed data storage system, a record within a destination virtual file, the record comprising a link directed to a source virtual file stored on a source node, the source node different from the destination node, and the distributed data storage system comprising a plurality of nodes each comprising at least one distinct server;
   receiving, at the destination node, a request to access data defined by the destination virtual file;
   providing, in response to the request, data from the source virtual file stored on the source node using the link;
   appending, to the record, data generated at the destination node, the appended data forming a delta log at the destination node;
   logging, at the source node, the delta log;
   overwriting, during a columnar table merge operation, the destination virtual file and the delta log with a new version of the destination virtual file, the new version of the destination virtual file comprising data from the source virtual file and the delta log;
   persisting the new version of the destination virtual file to secondary data storage including data volumes at which the new version of the destination virtual file is allocated at physical memory blocks to preserve the new version of the destination virtual file; and
   dropping the source virtual file after the new version of the destination virtual file is persisted to the secondary data storage such that the source virtual file and the delta log are available during a recovery operation prior to the new version of the destination virtual file being persisted to the secondary data storage.

2. The non-transitory computer readable storage medium as in claim 1, wherein the link in the record is overwritten during the columnar table merge operation.

3. The non-transitory computer readable storage medium as in claim 1, wherein the new version of the destination virtual file is persisted to the secondary data storage after a savepoint on the destination node, and wherein operations to the new version of the destination virtual file are re-applied following the savepoint and prior to a subsequent savepoint.

4. The non-transitory computer readable storage medium as in claim 1, wherein the dropping of the source virtual file comprises ceasing log operations relative to the source virtual file.

5. The non-transitory computer readable storage medium as in claim 4, wherein the dropping of the source virtual file comprises deleting the source virtual file.

6. A method comprising:
generating, on a destination node of a distributed data storage system, a record within a destination virtual file, the record comprising a link directed to a source virtual file stored on a source node, the source node different from the destination node, and the distributed data storage system comprising a plurality of nodes each comprising at least one distinct server;
receiving, at the destination node, a request to access data defined by the destination virtual file;
providing, in response to the request, data from the source virtual file stored on the source node using the link;
appending, to the record, data generated at the destination node, the appended data forming a delta log at the destination node;
logging, at the source node, the delta log;
overwriting, during a columnar table merge operation, the destination virtual file and the delta log with a new version of the destination virtual file, the new version of the destination virtual file comprising data from the source virtual file and the delta log;
persisting the new version of the destination virtual file to secondary data storage including data volumes at which the new version of the destination virtual file is allocated at physical memory blocks to preserve the new version of the destination virtual file; and
dropping the source virtual file after the new version of the destination virtual file is persisted to the secondary data storage such that the source virtual file and the delta log are available during a recovery operation prior to the new version of the destination virtual file being persisted to the secondary data storage.

7. The method as in claim 6, wherein the link in the record is overwritten during the columnar table merge operation.

8. The method as in claim 6, wherein the new version of the destination virtual file is persisted to the secondary data storage after a savepoint on the destination node, and wherein operations to the new version of the destination virtual file are re-applied following the savepoint and prior to a subsequent savepoint.

9. The method as in claim 6, wherein the dropping of the source virtual file comprises ceasing log operations relative to the source virtual file.

10. The method as in claim 9, wherein the dropping of the source virtual file comprises deleting the source virtual file.

11. A system comprising:
at least one data processor;
memory coupled to the at least one data processor, the memory storing instructions, which when executed by the at least one data processor, cause the at least one data processor to perform operations comprising:
generating, on a destination node of a distributed data storage system m, a record within a destination virtual file, the record comprising a link directed to a source virtual file stored on a source node, the source node different from the destination node, the distributed data storage system comprising a plurality of nodes each comprising at least one distinct server and the distributed data storage system configured to at least store data in a columnar format in columnar tables with one or more columns being stored in contiguous memory;
receiving, at the destination node, a request to access data defined by the destination virtual file;
providing, in response to the request, data from the source virtual file stored on the source node using the link;
appending, to the record, data generated at the destination node, the appended data forming a delta log at the destination node;
logging, at the source node, the delta log;
overwriting, during a columnar table merge operation, the destination virtual file and the delta log with a new version of the destination virtual file, the new version of the destination virtual file comprising data from the source virtual file and the delta log;
persisting the new version of the destination virtual file to secondary data storage including data volumes at which the new version of the destination virtual file is allocated at physical memory blocks to preserve the new version of the destination virtual file; and
dropping the source virtual file after the new version of the destination virtual file is persisted to the secondary data storage such that the source virtual file and the delta log are available during a recovery operation prior to the new version of the destination virtual file being persisted to the secondary data storage.

12. The non-transitory computer readable storage medium as in claim 1, wherein the operations further comprise:
flushing, by a persistence layer, the source virtual file from memory to physical storage.

13. The non-transitory computer readable storage medium as in claim 12, wherein the source virtual file is flushed to physical storage during page replacement or when a next savepoint is written.

14. The system as in claim 11, wherein the link in the record is overwritten during the columnar table merge operation.

15. The system as in claim 11, wherein the new version of the destination virtual file is persisted after a savepoint on the destination node, and wherein operations to the new version of the destination virtual file are re-applied following the savepoint and prior to a subsequent savepoint.

16. The system as in claim 11, wherein dropping the source virtual file comprises ceasing log operations relative to the source virtual file.

17. The system as in claim 16, wherein dropping the source virtual file comprises deleting the source virtual file.

18. The system as in claim 11, wherein the operations further comprise:
flushing, by a persistence layer, the source virtual file from memory to physical storage, wherein the source virtual file is flushed to physical storage during page replacement or when a next savepoint is written.

19. The method as in claim 6 further comprising:
flushing, by a persistence layer, the source virtual file from memory to physical storage.

20. The method as in claim 19, wherein the source virtual file is flushed to physical storage during page replacement or when a next savepoint is written.

21. The non-transitory computer readable storage medium as in claim 1, wherein the destination virtual file, at a time of the generating of the record, having first data and the source virtual file having second data different from the first data.

22. The system of claim 11, wherein a persistence layer maps the source virtual file to a chain of linked pages stored in a page buffer of the distributed data storage system and wherein the persistence layer maintains a directory that stores, for each source virtual file, a start page for the source virtual file, a size of the source virtual file, and a type of the source virtual file.

* * * * *